US009052040B2

(12) United States Patent
Rolf et al.

(10) Patent No.: US 9,052,040 B2
(45) Date of Patent: Jun. 9, 2015

(54) ALIGNMENT TOOL FOR ALIGNING SUBSEA ELEMENTS IN A PIGGYBACKED ARRANGEMENT

(75) Inventors: Lee Karl Rolf, Inverurie (GB); Henry William Himsworth, Balsham (GB); Lukasz Sobczak, Inverurie (GB)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 14/232,893

(22) PCT Filed: Jul. 12, 2012

(86) PCT No.: PCT/GB2012/051660
§ 371 (c)(1),
(2), (4) Date: Mar. 24, 2014

(87) PCT Pub. No.: WO2013/008023
PCT Pub. Date: Jan. 17, 2013

(65) Prior Publication Data
US 2014/0286708 A1 Sep. 25, 2014

(51) Int. Cl.
*F16L 1/20* (2006.01)
*F16L 1/235* (2006.01)

(52) U.S. Cl.
CPC . *F16L 1/20* (2013.01); *F16L 1/207* (2013.01); *F16L 1/235* (2013.01)

(58) Field of Classification Search
CPC .............. F16L 1/20; F16L 1/207; F16L 1/235
USPC ........ 405/158, 166, 168.1, 168.3, 169, 184.4, 405/184.5
See application file for complete search history.

(56) References Cited

U.S. PATENT DOCUMENTS

| 2,910,835 | A | 11/1959 | Timothy |
| 5,975,802 | A | 11/1999 | Willis |
| 6,641,330 | B1* | 11/2003 | Andersen et al. ............. 405/166 |
| 2003/0044234 | A1* | 3/2003 | Stockstill ................... 405/154.1 |
| 2008/0112762 | A1* | 5/2008 | van Zandwijk et al. ....... 405/166 |
| 2010/0080657 | A1* | 4/2010 | Bianchi ....................... 405/168.3 |
| 2010/0092244 | A1* | 4/2010 | Willis ........................... 405/166 |
| 2011/0081203 | A1 | 4/2011 | Vander Linden, III |
| 2011/0158748 | A1* | 6/2011 | Brocklebank et al. ........ 405/158 |
| 2013/0011200 | A1* | 1/2013 | Heggdal ........................ 405/169 |
| 2014/0140772 | A1* | 5/2014 | Rolf et al. ..................... 405/158 |

FOREIGN PATENT DOCUMENTS

| GB | 2 296 956 | 7/1996 |
| GB | 2 394 522 | 4/2004 |
| WO | WO 93/06401 | 4/1993 |
| WO | WO 2007/105962 | 9/2007 |

* cited by examiner

*Primary Examiner* — Benjamin Fiorello
(74) *Attorney, Agent, or Firm* — Levy & Grandinetti

(57) ABSTRACT

An alignment tool for aligning a secondary elongate element with a primary elongate element for subsea laying of the elements in a piggybacked arrangement is disclosed. The alignment tool comprises a support structure arranged to embrace the primary element. The support structure has an opening for accommodating the primary element such that the primary element can move longitudinally through the opening in a launching direction. The alignment tool further comprises attachment points for supporting the tool to maintain or control its longitudinal and/or angular position with respect to the primary element as the primary element moves through the opening.

15 Claims, 4 Drawing Sheets

ALIGNMENT TOOL FOR ALIGNING SUBSEA ELEMENTS IN A PIGGYBACKED ARRANGEMENT

This Application is the U.S. National Phase of International Application Number PCT/GB2012/051660 filed on Jul. 12, 2012, which claims priority to Great Britain Application No. 1112134.0 filed on Jul. 14, 2011.

BACKGROUND OF THE INVENTION (1) Field of the Invention

This invention relates to systems for aligning two or more parallel pipes, cables or other elongate elements during offshore operations, for example in a 'piggyback' arrangement during pipelaying.

It is often desirable to install two or more elongate elements along the same subsea route, such as a primary larger-diameter pipe for carrying hydrocarbons and a secondary smaller-diameter pipe for carrying water, gas or chemicals used to produce hydrocarbons.

Whilst pipes will be used as an example in this specification, an element need not be a pipe for carrying fluids but could instead be a cable for carrying power or data. A secondary element will usually be of much smaller diameter (typically <20 cm) than a primary element, but a difference in size between the elements is not essential to the invention in a broad sense.

Where elements such as pipes or cables are to follow the same route, it may be beneficial to install the elements simultaneously. This is commonly achieved by a piggyback technique where one or more secondary elements are attached by a succession of clamps to a primary element on a pipelay vessel, and the elements are then launched together in parallel toward the seabed.

Installation of a piggyback pipeline usually involves unspooling the secondary pipe on a pipelay vessel. The primary pipe may also be unspooled in a reel-lay arrangement although it could be fabricated on the pipelay vessel, for example in an S-lay operation.

(2) Description of Related Art

A typical reel-lay vessel 10 shown schematically in FIG. 1 is fitted with a storage and deployment reel 12 for deploying a primary pipe 14 and has an adjustable lay ramp 16 that is capable of deploying a range of products at varying lay angles, which may be from circa 20° to 90° to the horizontal. The inclination of the lay ramp 16 is determined by the depth of water in which the pipeline is being laid and by the characteristics of the pipeline, such as its diameter and stiffness.

In downstream succession from the reel 12, the lay ramp 16 carries a guide chute 18 for guiding the primary pipe 14; a pipe straightener 20 for straightening the primary pipe 14; a track-type tensioner 22 for gripping the primary pipe 14 between articulated tracks; and a hold-off clamp 24 for clamping the primary pipe 14 whenever the tensioner 22 releases the primary pipe 14. A travelling clamp could be used instead of a track-type tensioner 22; references in this specification to a tensioner should be taken to include a travelling clamp unless the context demands otherwise.

As FIG. 2 shows, a piggyback reel 26 can be fitted to a vessel 10 for deploying a secondary element such as a secondary pipe 28 with the primary pipe 14 when operating in piggyback mode. In that mode, a piggyback chute 30 guides the secondary pipe 28 and the secondary pipe 28 is brought into alignment with the primary pipe 14, such that the secondary pipe 28 lies parallel to the primary pipe 14 downstream of the tensioner 22. The secondary pipe 28 then lies directly above the longitudinal centreline of the primary pipe 14 or, when the primary pipe 14 is vertical, directly aft of the longitudinal centreline of the primary pipe 14. The secondary pipe 28 is then ready to be clamped to the primary pipe 14 at work platforms in a shelter 32 on the lay ramp 16 between the tensioner 22 and the hold-off clamp 24.

In practice an additional straightener may be used for the secondary pipe 28 downstream of the piggyback chute 30 but this has been omitted from FIG. 2 for clarity. Also, the secondary pipe 28 may go through an additional tensioner but such a tensioner may not be required and has also been omitted for clarity.

In a prior art piggybacking arrangement, it is known for a secondary pipe 28 to be diverted entirely around the tensioner 22 before being aligned with the primary pipe. This makes it difficult to align the secondary pipe 28 without overbending it or requiring additional straightening, unless there is a substantial and disadvantageous gap under the tensioner 22. The heavy tensioner 22 should be mounted as low as possible on the lay ramp 16 to aid the stability of the vessel 10.

U.S. Pat. No. 5,975,802 to Willis (Assignee: Stolt Comex Seaway Ltd.) discloses a known piggyback arrangement in detail, including the relationship between the paths of a primary pipe and a secondary pipe as they pass over their respective chutes and are brought together for clamping. In the example shown in U.S. Pat. No. 5,975,802, the primary pipe is fabricated on board the pipelay vessel and the secondary pipe is unspooled from a reel, although it will be clear to the skilled reader that both pipes could be spooled with the addition of a storage and deployment reel for the primary pipe, as in FIG. 2. The content of U.S. Pat. No. 5,975,802 is incorporated herein by reference, as technical background to the present invention.

BRIEF SUMMARY OF THE INVENTION

It is against this background that the present invention has been devised.

The invention resides in an alignment tool for aligning a secondary elongate element with a primary elongate element for subsea laying of the elements in a piggybacked arrangement, wherein the tool comprises:

a support structure arranged to embrace the primary element, the support structure having an opening for accommodating the primary element such that the primary element can move longitudinally through the opening in a launching direction; and attachment points for supporting the tool to maintain or control its longitudinal and/or angular position with respect to the primary element as the primary element moves through the opening.

The tool is preferably arranged such that the primary element supports the tool as the primary element moves in the launching direction through the opening in the support structure. For example, the tool suitably has having rollers around the opening of the support structure to bear against the primary element in use.

Advantageously, the tool is arranged to be suspended by chains, wires or the like at the attachment points.

The support structure is suitably a ring for encircling the primary element. The ring is preferably in separable parts that may be assembled around the primary element.

The support structure preferably lies generally in a plane that is substantially orthogonal to the launching direction of the primary element.

The tool of the invention may further comprise a guide on the support structure for rerouting the secondary element from a first angular position to a second angular position with respect to the primary element. The guide is preferably movable radially with respect to the support structure; for example, the guide may comprise a tube having a base movable along a radially-extending slot in the support structure for accommodating the secondary element.

The invention extends to an alignment system for aligning a secondary elongate element with a primary elongate element for subsea laying of the elements in a piggybacked arrangement, the system comprising the alignment tool of any preceding claim, mounted downstream of a tensioner on a lay ramp of a vessel. In that system, the tool is conveniently suspended from a support structure of the tensioner and may be mounted upstream of a work region where the secondary element is attached to the primary element.

Where the tensioner comprises a plurality of tracks aligned generally with, and spaced apart around, the primary element, at least one of the tracks being above the primary element, the secondary element is advantageously fed to the tool along a space between neighbouring tracks of the tensioner and is guided by the tool to a position above the primary element.

The invention also embraces a method of aligning a secondary elongate element with a primary elongate element for subsea laying of the elements in a piggybacked arrangement, comprising feeding the secondary element at a first angular position with respect to the primary element along a space between neighbouring tracks of a tensioner and then guiding the secondary element into a second angular position with respect to the primary element for attachment to the primary element.

BRIEF DESCRIPTION OF THE SEVERAL VIEWS OF THE DRAWINGS

To describe the state of the art, reference has already been made to FIGS. 1 and 2 of the accompanying drawings, in which.

Figure 1:
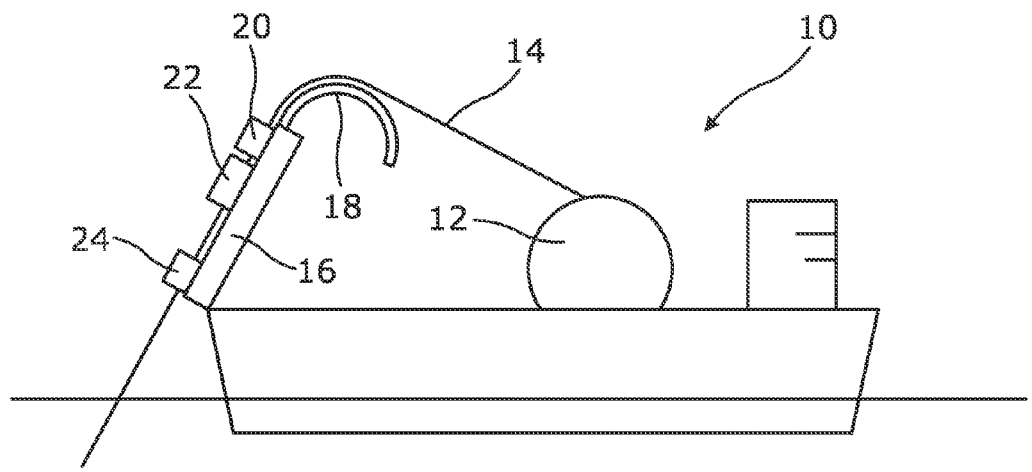
FIG. 1 is a schematic side view of a typical reel-lay vessel.
Figure 2:
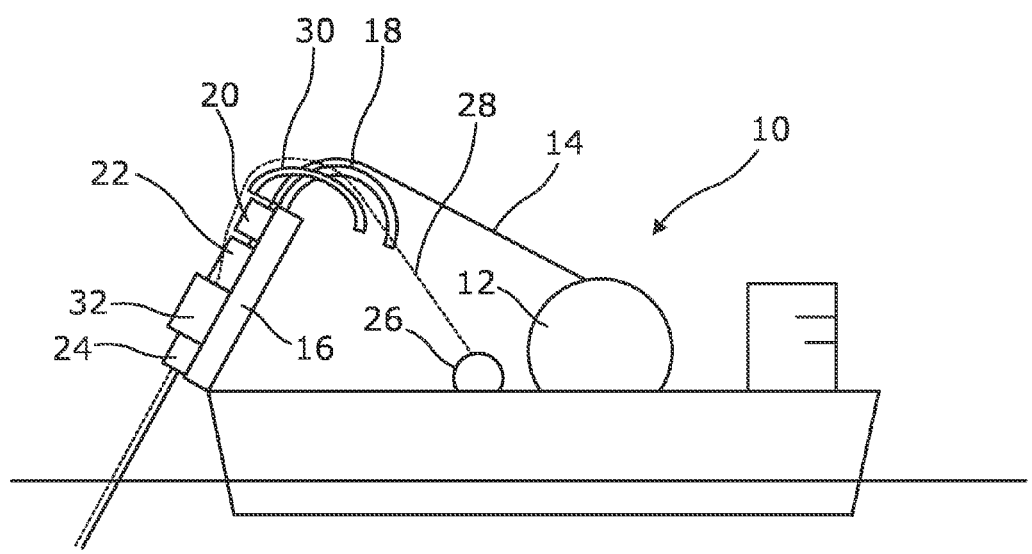
FIG. 2 is a schematic side view of a reel-lay vessel adapted for piggyback pipe laying.
Figure 3:
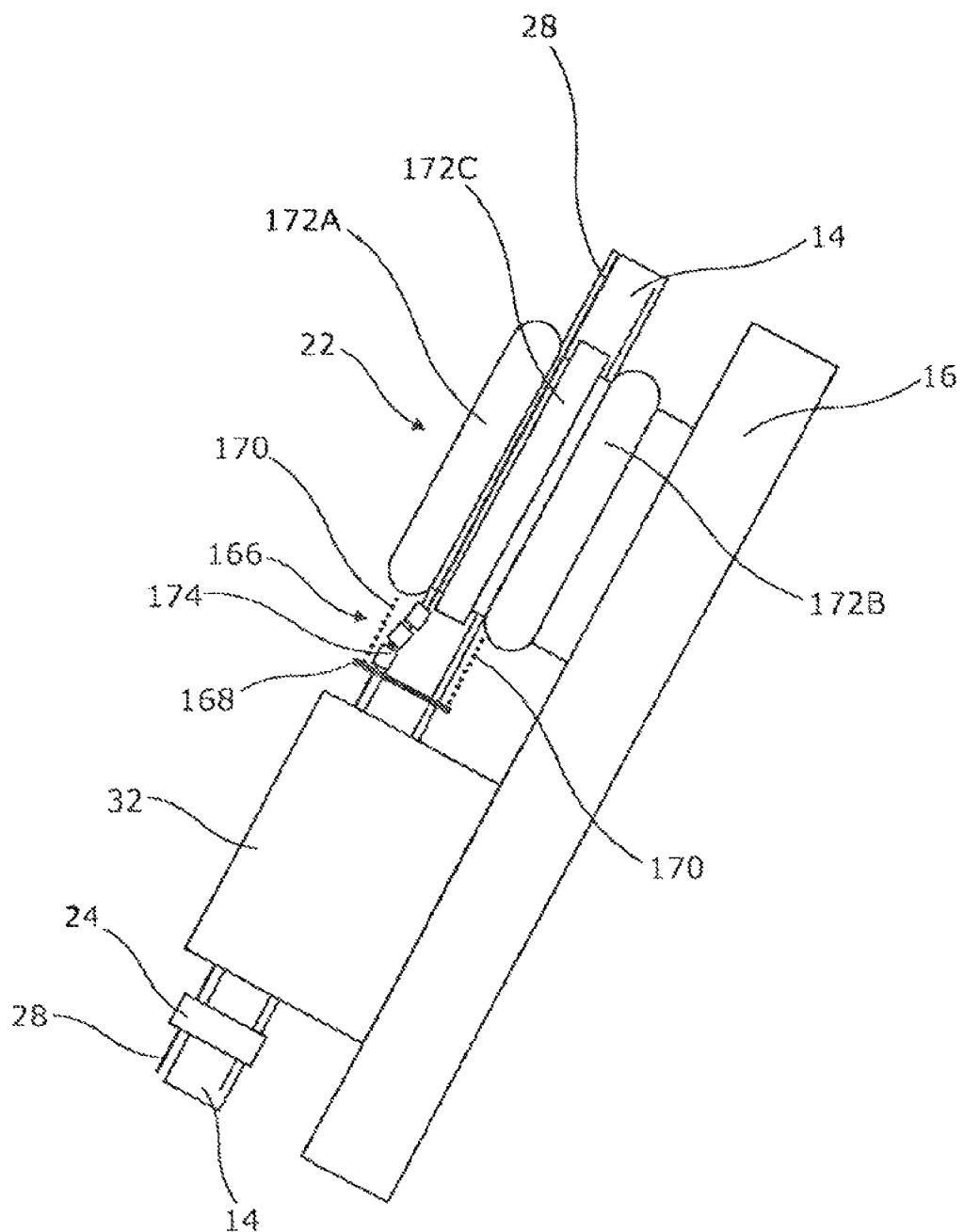
Figure 4:
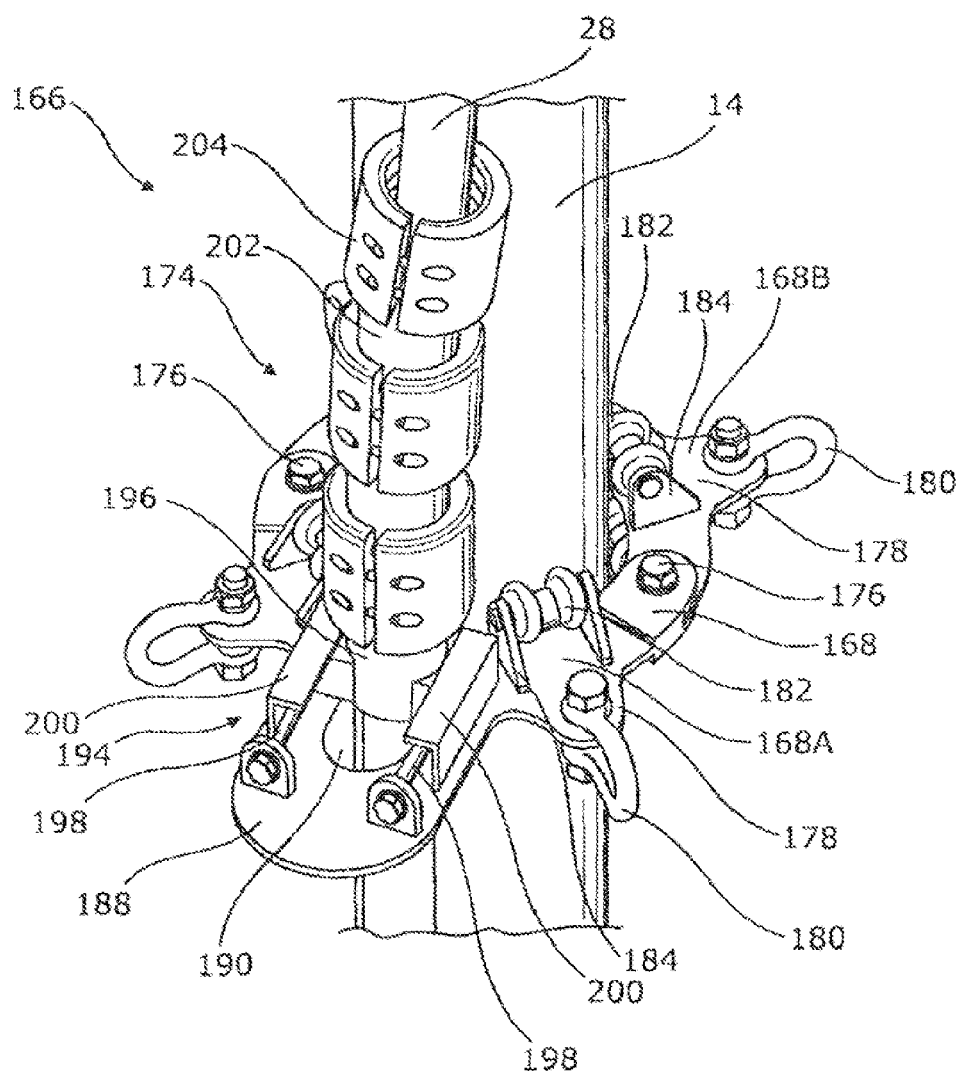
Figure 5:
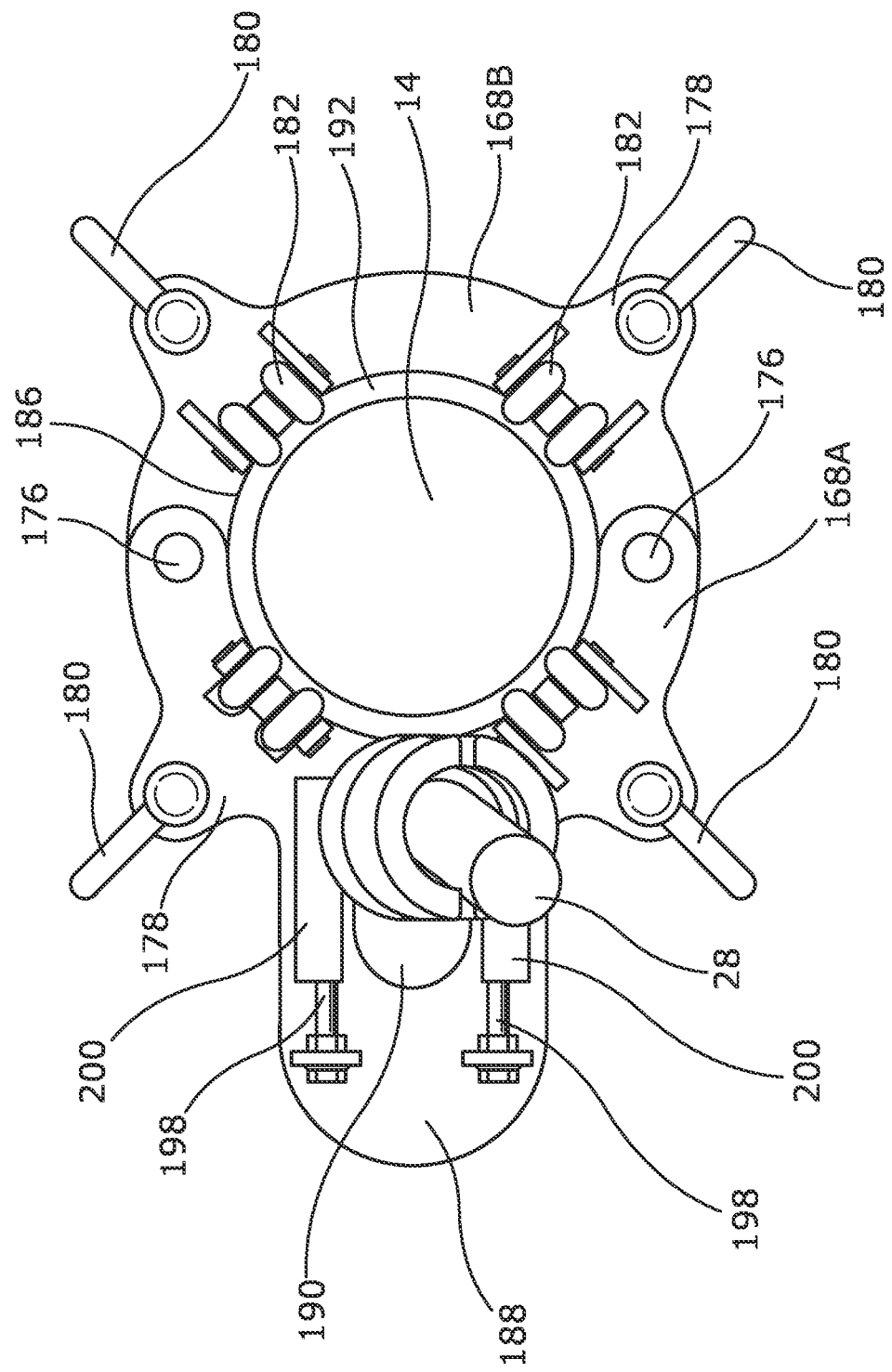

In order that the invention may readily be understood, reference will now be made, by way of example, to the remaining drawings in which:

FIG. 3 is a schematic side view showing an alignment tool in accordance with the invention in use on a pipelaying vessel to bring a secondary pipe into alignment with a primary pipe for clamping;

FIG. 4 is a schematic perspective view of the alignment tool of FIG. 3 in use; and FIG. 5 is a schematic cross-sectional view of the alignment tool of FIG. 3 in use.

DETAILED DESCRIPTION OF THE INVENTION

FIGS. 3 to 5 of the drawings show an alignment tool 166 in accordance with the invention for bringing a secondary pipe 28 or other element into alignment with a primary pipe 14 or other element. It will be recalled that the secondary pipe 28 needs to be parallel to the primary pipe 14 downstream of the tensioner 22, at a position directly above the longitudinal centreline of the primary pipe 14 when the primary pipe 14 is inclined. When the primary pipe 14 is vertical, the secondary pipe 28 needs to be directly aft of the longitudinal centreline of the primary pipe 14.

Once aligned in this way, the secondary pipe 28 is then ready to be clamped to the primary pipe 14 in a shelter 32 on the lay ramp 16 before the piggybacked pipe is launched into the sea. The alignment tool 166 may be used with manual clamping techniques or the shelter 32 may contain apparatus for automated clamping.

The alignment tool 166 of the invention aims for simplicity, compactness and effectiveness. Simplicity ensures reliability, low cost and ease of mounting to existing structures on the lay ramp 16 without major adaptation. Compactness maximises space utilisation on the lay ramp 16 and in particular leaves ample room for clamping apparatus in the shelter 32 while allowing the heavy tensioner 22 to be mounted as low as possible on the lay ramp 16 to lower the centre of gravity of the pipelay vessel for stability. Effectiveness ensures that the secondary pipe 28 is routed efficiently and without overbending or exceeding the minimum bend radius of the secondary pipe 28.

With particular reference to FIG. 3, the alignment tool 166 comprises a generally flat ring 168 surrounding the primary pipe 14 in a plane substantially orthogonal to the direction of movement of the primary pipe 14 along the lay ramp 16. The alignment tool 166 lies compactly between a tensioner 22 and a shelter 32 mounted on the lay ramp where the primary and secondary pipes 14, 28 are clamped together. Four chains 170 equi-spaced around the ring 168 hang the ring 168 from the supporting structure of the tensioner 22. Only two of the chains 170 are visible in this side view.

The tensioner 22 shown in FIG. 3 is a four-track tensioner in which four articulated tracks 172 surround the primary pipe 14: a top track 172A above; a bottom track 172B below; and two side tracks 172C, one to each side. Only one of the side tracks 172C is visible in this side view.

In a prior art piggybacking arrangement, it is known for a secondary pipe 28 to be diverted entirely around a tensioner 22 before being aligned with the primary pipe 14. This makes it difficult to align the secondary pipe 28 without overbending it or requiring additional straightening. In contrast, the arrangement shown in FIG. 3 runs the secondary pipe 28 along the narrow gap between the top track 172A and one of the side tracks 172C of the tensioner 22. Consequently the alignment tool 166 need only move the secondary pipe 28 about 45° around the primary pipe 14 from its position immediately downstream of the tensioner 22 to its position directly above or aft of the primary pipe 14, ready for clamping to the primary pipe 14 in the shelter 32.

This minimal deflection of the secondary pipe 28 is advantageous as it avoids imparting excessive bending stress to the secondary pipe 28; it also effects the necessary alignment of the secondary pipe 28 in a short length parallel to the lay ramp 16, to the benefit of compactness.

The secondary pipe 28 runs in an articulated guide tube 174 attached to the ring 168 of the alignment tool 166. Further details of the guide tube 174 are evident from the detail views of the alignment tool 166 in FIGS. 4 and 5, to which specific reference is now made.

FIGS. 4 and 5 show that the ring 168 of the alignment tool 166 is in two largely semicircular C-shaped parts 168A, 168B that are coupled to each other around the primary pipe 14 by diametrically-opposed bolts 176. Each part 168A, 168B has radially-extending lugs 178 at 90° to each other, each lug 178 supporting a shackle 180 for attaching one of the aforementioned chains 170.

Inboard of each lug 178, a pair of rollers 182 is mounted on a support 184 to overlap the inner edge 186 of the ring 168. The four pairs of rollers 182 bear against the primary pipe 14 with rolling contact to support the alignment tool 166 in use.

One of the parts 168A has a U-shaped radial extension 188 having a radially-extending slot 190 that opens into the central aperture 192 of the ring 168. The slot 190 surrounds and accommodates the secondary pipe 28, which runs in the articulated guide tube 174 upstanding from the extension 188. Specifically, the extension 188 has parallel rails 194 disposed one each side of the slot 190, between which a T-section base 196 of the guide tube 174 can move radially to adjust the radial position of the secondary pipe 28 with respect to the primary pipe 14. The radial position of the base 196 of the guide tube 174 is adjusted by screws 198 parallel to and between the rails 194, that engage with respective T-section arms of the base 196. The rails 194 have upper flanges 200 that overlap the T-section arms of the base 196 to hold the guide tube 174 on the radial extension 188.

The articulated guide tube 174 comprises segments 202 and a succession of joint collars 204 between the segments 202. The lowermost segment includes the T-section base 196. The segments 202 may, for example, be of cast iron, steel or plastics. They may be rigid or flexible, and may be coated or uncoated depending on the nature of the secondary pipe 28 or other secondary element.

The invention claimed is:

1. An alignment tool for aligning a secondary elongate element with a primary elongate element for subsea laying of the elements in a piggybacked arrangement, wherein the tool comprises:
    a support structure arranged to embrace the primary element, the support structure having an opening for accommodating the primary element such that the primary element can move longitudinally through the opening in a launching direction;
    attachment points for supporting the tool to maintain or control its longitudinal and/or angular position with respect to the primary element as the primary element moves through the opening; and
    a guide on the support structure for rerouting the secondary element from a first angular position to a second angular position with respect to the primary element.

2. The alignment tool of claim 1, and being arranged such that the primary element supports the tool to restrain the tool horizontally as the primary element moves in the launching direction through the opening in the support structure.

3. The alignment tool of claim 2, having rollers around the opening of the support structure to bear against the primary element in use.

4. The alignment tool of claim 1, being arranged to be suspended by chains or wires at the attachment points.

5. The alignment tool of claim 1, wherein the support structure is a ring for encircling the primary element.

6. The alignment tool of claim 5, wherein the ring is in separable parts arranged to be assembled around the primary element.

7. The alignment tool of claim 1, wherein the support structure lies generally in a plane that is substantially orthogonal to the launching direction of the primary element.

8. The alignment tool of claim 1, wherein the guide is movable radially with respect to the support structure.

9. The alignment tool of claim 8, wherein the guide comprises a tube having a base movable along a radially-extending slot in the support structure for accommodating the secondary element.

10. An alignment system for aligning a secondary elongate element with a primary elongate element for subsea laying of the elements in a piggybacked arrangement, the system comprising the alignment tool of claim 1, mounted downstream of a tensioner on a lay ramp of a vessel.

11. The alignment system of claim 10, where the tool is suspended from a support structure of the tensioner.

12. The alignment system of claim 10, wherein the tool is mounted upstream of a work region where the secondary element is attached to the primary element.

13. The alignment system of claim 10, where the tensioner comprises a plurality of tracks aligned generally with, and spaced apart around, the primary element, at least one of the tracks being above the primary element, and the secondary element is fed to the tool along a space between neighbouring tracks of the tensioner and is guided by the tool to a position above the primary element.

14. A method of aligning a secondary elongate element with a primary elongate element for subsea laying of the elements in a side-by-side piggybacked arrangement, comprising feeding the secondary element at a first angular position with respect to the primary element along a space between neighbouring tracks of a tensioner and then guiding the secondary element into a second angular position with respect to the primary element for attachment to the primary element.

15. A laying vessel fitted with the tool as defined in claim 1, having an alignment system for aligning a secondary elongate element with a primary elongate element for subsea laying of the elements in piggybacked arrangement, the system comprising the alignment tool, mounted downstream of a tensioner on a lay ramp of a vessel.

* * * * *